(12) United States Patent
Konishi

(10) Patent No.: US 10,846,869 B2
(45) Date of Patent: Nov. 24, 2020

(54) STREAK-LIKE REGION DETECTING DEVICE, STREAK-LIKE REGION DETECTING METHOD, AND PROGRAM

(71) Applicant: OMRON Corporation, Kyoto (JP)

(72) Inventor: Yoshinori Konishi, Kyoto (JP)

(73) Assignee: OMRON Corporation, Kyoto (JP)

( * ) Notice: Subject to any disclaimer, the term of this patent is extended or adjusted under 35 U.S.C. 154(b) by 64 days.

(21) Appl. No.: 16/340,153

(22) PCT Filed: Oct. 24, 2017

(86) PCT No.: PCT/JP2017/038324
§ 371 (c)(1),
(2) Date: Apr. 8, 2019

(87) PCT Pub. No.: WO2018/110089
PCT Pub. Date: Jun. 21, 2018

(65) Prior Publication Data
US 2019/0244373 A1    Aug. 8, 2019

(30) Foreign Application Priority Data

Dec. 15, 2016 (JP) .................................. 2016-243249

(51) Int. Cl.
*G06K 9/00* (2006.01)
*G06T 7/40* (2017.01)
(Continued)

(52) U.S. Cl.
CPC ............... *G06T 7/40* (2013.01); *G01M 11/00* (2013.01); *G06T 1/00* (2013.01); *G06T 5/20* (2013.01); *G06T 7/00* (2013.01); *G06T 7/60* (2013.01)

(58) Field of Classification Search
None
See application file for complete search history.

(56) References Cited

U.S. PATENT DOCUMENTS 6,275,600 B1 * 8/2001 Banker ................. G06K 15/00
                                                                  358/406
6,393,161 B1 * 5/2002 Stevenson ................ G06T 5/20
                                                                  358/461
(Continued)

FOREIGN PATENT DOCUMENTS

JP    2004-199200 A    7/2004
JP    2005-174179 A    6/2005
(Continued)

OTHER PUBLICATIONS

Single-Image Deraining Using an Adaptive Nonlocal Means Filter, Jin-Hwan Kim et al., IEEE, 978-1-4799-2341-0, 2013, pp. 914-917 (Year: 2013).*

(Continued)

*Primary Examiner* — Jayesh A Patel
(74) *Attorney, Agent, or Firm* — Metrolex IP Law Group, PLLC

(57) ABSTRACT

A streak-like region detecting device includes: an image acquiring unit which acquires an image; a first filter operation unit which applies, to the image, a first filter responsive to increase in luminance in a first direction and acquires a first response value at an application position of the first filter; a second filter operation unit which applies, to the image, a second filter responsive to decrease in luminance in the first direction and acquires a second response value at an application position of the second filter; a detecting unit which detects a streak-like region having a width corresponding to the distance between the application positions of the first and second filters in the first direction on the basis of an integrated value obtained by integrating the first and second response values; and an output unit which outputs information obtained by the detecting unit.

10 Claims, 13 Drawing Sheets

(51) Int. Cl.
*G06T 5/20* (2006.01)
*G01M 11/00* (2006.01)
*G06T 7/60* (2017.01)
*G06T 7/00* (2017.01)
*G06T 1/00* (2006.01)

(56) References Cited

U.S. PATENT DOCUMENTS

| | | | | |
|---|---|---|---|---|
| 7,043,080 | B1* | 5/2006 | Dolan | G06K 9/00456 358/3.13 |
| 7,450,746 | B2* | 11/2008 | Yang | A61B 5/0456 382/128 |
| 8,457,351 | B2* | 6/2013 | Ito | G06K 9/4647 382/103 |
| 8,548,204 | B2* | 10/2013 | Ikubo | G06K 9/03 382/112 |
| 8,761,454 | B2* | 6/2014 | Berkovich | G06K 9/50 382/112 |
| 9,036,937 | B2* | 5/2015 | Tsai | G06T 5/20 382/260 |
| 2003/0044088 | A1* | 3/2003 | Wright | G06T 3/4007 382/300 |
| 2004/0233467 | A1* | 11/2004 | Namizuka | H04N 1/00127 358/1.13 |
| 2006/0204053 | A1* | 9/2006 | Mori | G06K 9/00 382/118 |
| 2007/0253596 | A1* | 11/2007 | Murata | G06K 9/6203 382/103 |
| 2007/0291999 | A1* | 12/2007 | Ito | G06T 7/73 382/118 |
| 2009/0163812 | A1* | 6/2009 | Chouno | G16H 50/30 600/443 |
| 2011/0279684 | A1* | 11/2011 | Motoyama | H04N 19/14 348/181 |
| 2012/0045122 | A1* | 2/2012 | Gomi | H04N 5/23222 382/165 |
| 2012/0230600 | A1* | 9/2012 | Tsai | G06T 5/20 382/260 |
| 2012/0288200 | A1* | 11/2012 | Berkovich | G06K 9/50 382/181 |
| 2015/0110505 | A1* | 4/2015 | Takahashi | G03G 15/5062 399/15 |
| 2015/0178586 | A1* | 6/2015 | Ushijima | G06K 9/00248 382/103 |
| 2017/0308017 | A1* | 10/2017 | Tomii | G03G 15/5062 |

FOREIGN PATENT DOCUMENTS

| | | | | |
|---|---|---|---|---|
| JP | 2005-346300 | A | 12/2005 | |
| JP | 2007-285753 | A | 11/2007 | |
| JP | 2007-293722 | A | 11/2007 | |
| JP | 2007293722 | A | * 11/2007 | G06K 9/6857 |
| WO | 2007/135884 | A1 | 11/2007 | |

OTHER PUBLICATIONS

A Novel Algorithm for Detecting Streaks in Mottled and Noisy Images, Hector Santos Rosario et al., ICIS '06 International Congress of Imaging Science Final Program and Proceedings, 2006, pp. 668-671 (Year: 2006).*

The English translation of the International Preliminary Report on Patentability (Chapter II) dated Jun. 20, 2019 in the International Application No. PCT/JP2017/038324.

Mahdjoub, Jason et al.:"A multi-agent approach for the edge detection in image processings", Jun. 1, 2006, pp. 1-13, XP055690545, Retrieved from the Internet: URL:https://www.researchgate.net/profile/Jason_Mahdjoub/publication/228987148_A_multi-agent_approach_for_the_edge_detection_in_image_processings/links/00b4953375172ac6d3000000/A-multi-agent-approach-for-the-edge-detection-in-image-processings.pdf, retrieved on Apr. 29, 2020, Relevance is indicated in the EESR issued on May 12, 2020.

Jiang Bo Ed et al:"Real-time multi-resolution edge detection with pattern analysis on graphics processing unit", Journal of Real-Time Image Processing, Sep. 11, 2014, pp. 293-321, vol. 14, No. 2, Springer, DE, Relevance is indicated in the EESR issued on May 12, 2020.

The extended European search report (EESR) dated May 12, 2020 in the counterpart European Application.

An English translation of the International Search Report ("ISR") of PCT/JP2017/038324 dated Nov. 28, 2017.

An English translation of the International Searching Authority ("ISA") Written Opinion ("WO") of PCT/JP2017/038324 dated Nov. 28, 2017.

* cited by examiner

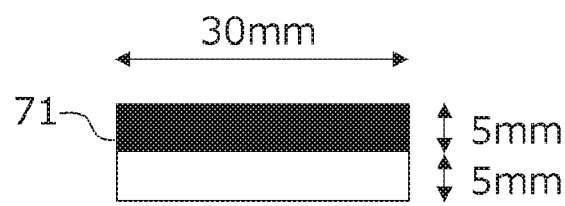
FIG.7A
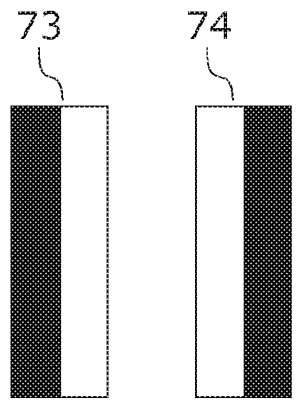
FIG.7B
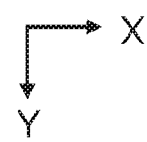
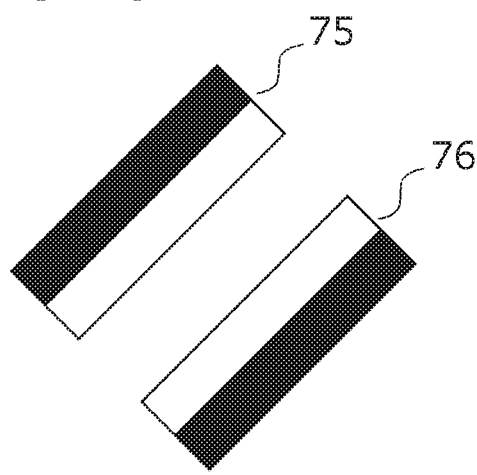
FIG.7C

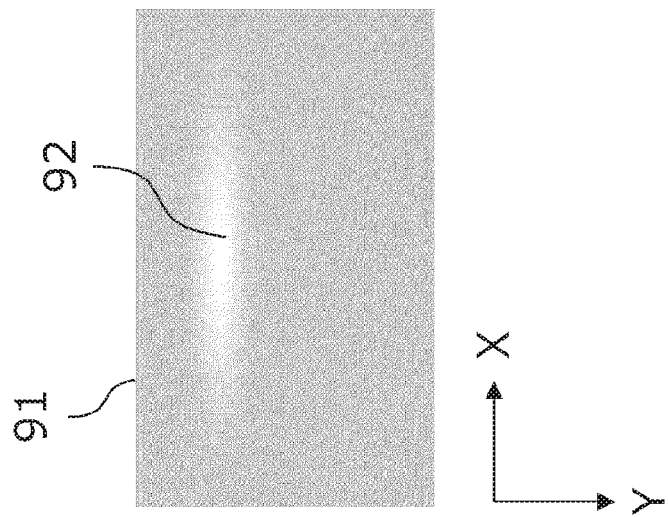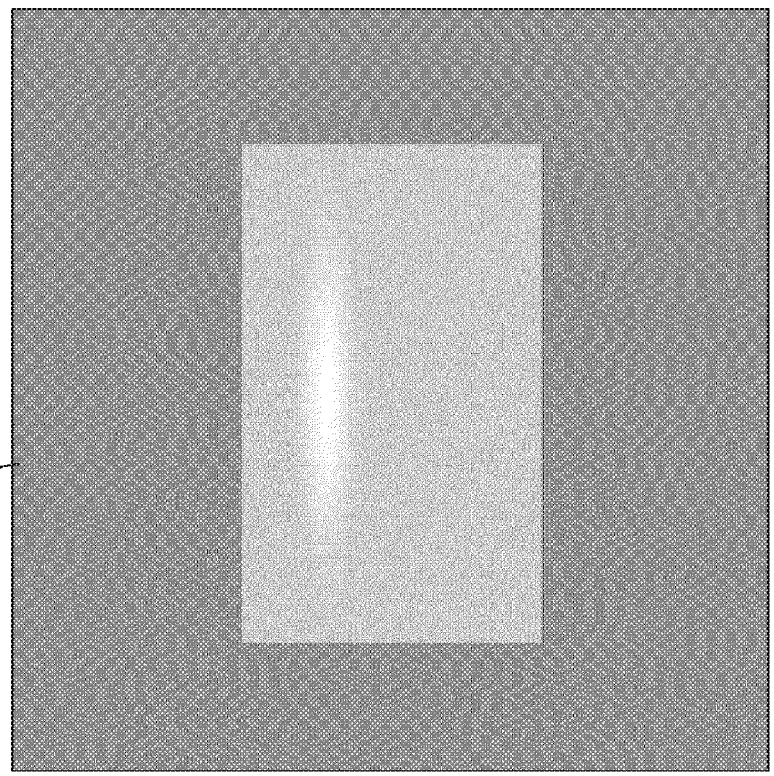

STREAK-LIKE REGION DETECTING DEVICE, STREAK-LIKE REGION DETECTING METHOD, AND PROGRAM

TECHNICAL FIELD

The present invention relates to a technique for detecting a streak-like region in an image.

BACKGROUND ART

An edge-lit type plane light source device is used as a backlight for a liquid crystal display device. The edge-lit type device includes light sources such as LEDs (Light Emitting Diodes) along an edge of the light-emitting surface of the plane light source device and is configured to guide light emitted from the light sources to the light-emitting surface by a plate-shaped light guide (called a light-guiding panel). The edge-lit type plane light source device can be relatively easily reduced in size/thickness and therefore has been widely used in small size electronic equipment such as a smart phone.

An edge-lit plane light source device may be encountered with a failure related to luminance unevenness attributable to various causes such as a defect in a mold for a light-guiding panel or poor molding thereof and shifting during assembly. One such failure is a bright or dark region appearing to linearly extend in a streak-like shape in one direction. The bright region has relatively high luminance with respect to the surrounding region, and the dark region has relatively low luminance with respect to the surrounding region. Herein, the failure of this kind will be referred to as a "streak-like region" or a "streak-like defect".

At present, inspection of failures of this kind actually depends on visual sensory inspection carried out by a person (an inspector). Therefore, the inspection procedure may take time and trouble and can be costly or the results of the inspection depend much on personal skills, and there has been a demand for automation and objectification (quantification) of the inspection.

PTL 1 suggests a method for automatically inspecting for a streak-like defect at a display device such as a liquid crystal panel or a projector as an applied product thereof by image processing. According to the method, an image acquired by photographing a test object is scanned with a filter having a kernel in coincidence with the luminance variation pattern of a streak-like defect and the streak-like defect is detected.

CITATION LIST

Patent Literature

PTL 1: Japanese Patent Application Publication No. 2005-346300

SUMMARY OF INVENTION

Technical Problem

According to the method disclosed in PTL 1, streak-like defects having a luminance variation pattern in coincidence with the kernel can be detected accurately, while the other streak-like defects (such as streak-like defects having different widths) cannot be detected or the detection accuracy for the defects may be extremely lower. Therefore, if the width of a streak-like defect to be detected is indefinite (more specifically, if streak-like defects with different widths must be detected), multiple filters must be prepared according to expected different widths, which requires larger memory capacity and thus increases the cost. In addition, scanning using a number of filters prolongs processing time required for detecting the defects.

With the foregoing in view, it is an object to provide a filtering method which allows a streak-like region with an arbitrary width to be detected from an image.

Solution to Problem

In order to achieve the above-described object, according to algorithm proposed according to the present invention, two kinds of filters are used to detect a streak-like region on the bases of an integrated value obtained by combining response values from the filters.

More specifically, a streak-like region detecting device provided according to a first aspect of the present invention includes an image acquiring unit which acquires an image, a first filter operation unit which applies, to the image, a first filter responsive to increase in luminance in a first direction and acquires a first response value as a response value by the first filter at an application position of the first filter, a second filter operation unit which applies, to the image, a second filter responsive to decrease in luminance in the first direction and acquires a second response value as a response value by the second filter at an application position of the second filter, a detecting unit which detects a streak-like region having a width corresponding to the distance between the application position of the first filter and the application position of the second filter in the first direction on the basis of an integrated value obtained by integrating the first and second response values, and an output unit which outputs information obtained by the detecting unit.

In this configuration, the distance between the application position of the first filter and the application position of the second filter in the first direction (hereinafter referred to as a "filter interval") is set to a desired value, so that the width of a streak-like region to be detected can be changed. Therefore, a streak-like region having an arbitrary width can be detected using only the two filters. This can considerably reduce the man-hours necessary for designing the filters and the memory capacity for the filters.

Here, "being responsive to increase in luminance in the first direction" indicates that a response value by a filter takes a positive value when the luminance of an image tends to increase in the first direction in a local region to which the filter is applied. Meanwhile, "being responsive to decrease in luminance in the first direction" indicates that a response value by a filter takes a positive value when the luminance of an image tends to decrease in the first direction in a local region to which the filter is applied. Note that the "first direction" may be the horizontal direction, the vertical direction, or an oblique direction of the image.

The first filter operation unit may change the application position of the first filter and acquire multiple first response values, the second filter operation unit may change the application position of the second filter and acquire multiple second response values, and the detecting unit is capable of detecting multiple kinds of streak-like regions with different widths by changing a combination of first and second response values selected from the multiple first response values and the multiple second response values.

In this configuration, the amount of filter operation necessary for detecting multiple kinds of streak-like regions with different widths may be greatly reduced as compared to the amount which would be necessary by a conventional method (which uses multiple filters for widths to be detected). Therefore, the method according to the present invention provides an advantageous effect in that the time for processing can be shorter than the conventional method when two or more streak-like regions are to be detected or the width of a streak-like region is indefinite.

The first filter operation unit may acquire multiple first response values while shifting the application position of the first filter in the first direction, the second filter operation unit may acquire multiple second response values while shifting the application position of the second filter in the first direction, and the detecting unit may select a combination of first and second response values which maximizes the integrated value from the multiple first response values and the multiple second response values, and determine the presence or absence of a streak-like region on the basis of the maximum integrated value.

The use of the "maximum integrated value" allows a streak-like region with an arbitrary width appearing in an arbitrary position in an image to be accurately detected.

The streak-like region may be a region extending in a second direction that is orthogonal to the first direction, the first filter operation unit may acquire multiple first response values while shifting the application position of the first filter in the second direction, the second filter operation unit may acquire multiple second response values while shifting the application position of the second filter in the second direction, the detecting unit may calculate an integrated value obtained by integrating the multiple first response values and the multiple second response values and determine the presence or absence of a streak-like region extending in the second direction on the basis of the integrated value.

As a bright region or a dark region with the same width extends longer in the second direction, the integrated value takes a greater value. Therefore, the use of the integrated value allows a streak-like region extending in the second direction to be accurately detected.

The output unit may output the evaluation value and a result of determination on the presence or absence of the streak-like region. The user can immediately determine the presence or absence of a streak-like region by referring to the output result of determination. In addition, the evaluation value is output, and the reason for the result of determination can be checked, so that convincingness and objectivity about the result of determination may improve.

The output unit may output an image obtained by superposing information indicating the position of the detected streak-like region on the image or an image obtained by processing the image. The output of the superposed image allows the position of a streak-like region to be grasped intuitively and easily, which is useful in checking the actual product.

The output unit may output a one-dimensional luminance profile representing change in a luminance value in the first direction. The output of the luminance profile allows the state of a streak-like region (the difference in luminance with respect to the surrounding region) to be grasped.

For example, the image acquired by the image acquiring unit may be a photographed image of a light-emitting surface of a plane light source device, and the detecting unit may be adapted to detect a streak-like bright or dark region appearing because of luminance unevenness in the light-emitting surface. More specifically, the present invention may be applied to inspection of a plane light source device.

Note that the present invention may be implemented as a streak-like region detecting device, a streak-like region quantifying device, and a streak-like region inspecting device having at least part of the configuration and functions. The present invention may be implemented as a streak-like region detecting method, a streak-like region quantifying method, or a streak-like region inspecting method including at least part of the above processing; a program which allows a computer to execute any of the methods; or a computer-readable recording medium which records the program in a non-transitory manner. The present invention may be implemented by combining parts of the configuration and the processing unless any technical discrepancy arises.

Advantageous Effects of Invention

According to the present invention, a filtering method which allows a streak-like region with an arbitrary width to be detected can be provided.

BRIEF DESCRIPTION OF DRAWINGS

FIG. 7A is a view of a filter for detecting a longitudinal streak, FIG. 7B is a view of a filter for detecting a lateral streak, and FIG. 7C is a view of a filter for detecting an oblique streak.

FIG. 9A is a view of an example of an input image, and FIG. 9B is a view of an example of a light emission surface image extracted from the input image.

DESCRIPTION OF EMBODIMENTS

The present invention relates to a technique for detecting a streak-like region from an image using filters. The technique can be applied to general image recognition or image analysis. Preferred embodiments of the present invention will be described by referring to an application of the present invention to inspection for a streak-like region at a plane light source device. The inspection technique can be applied to in-line inspection in the final process in a manufacturing line for a plane light source device or acceptance inspection for a part (a plane light source device) by a manufacturer of a product which includes a plane light source device. Note that in the following description of the embodiments, the plane light source device is a backlight used in a liquid crystal display device by way of illustration, while the present invention may be applied to inspection of a plane light source device for any other use such as a lighting device and a digital signage device.

Hereinafter, a preferred embodiment of the present invention will be described with reference to the drawings. Note however that the configuration and operation of a device disclosed in the following description of the embodiment are described by way of illustration, and the same is not intended to limit the scope of the present invention.

First Embodiment (Plane Light Source Device)

Figure 1:
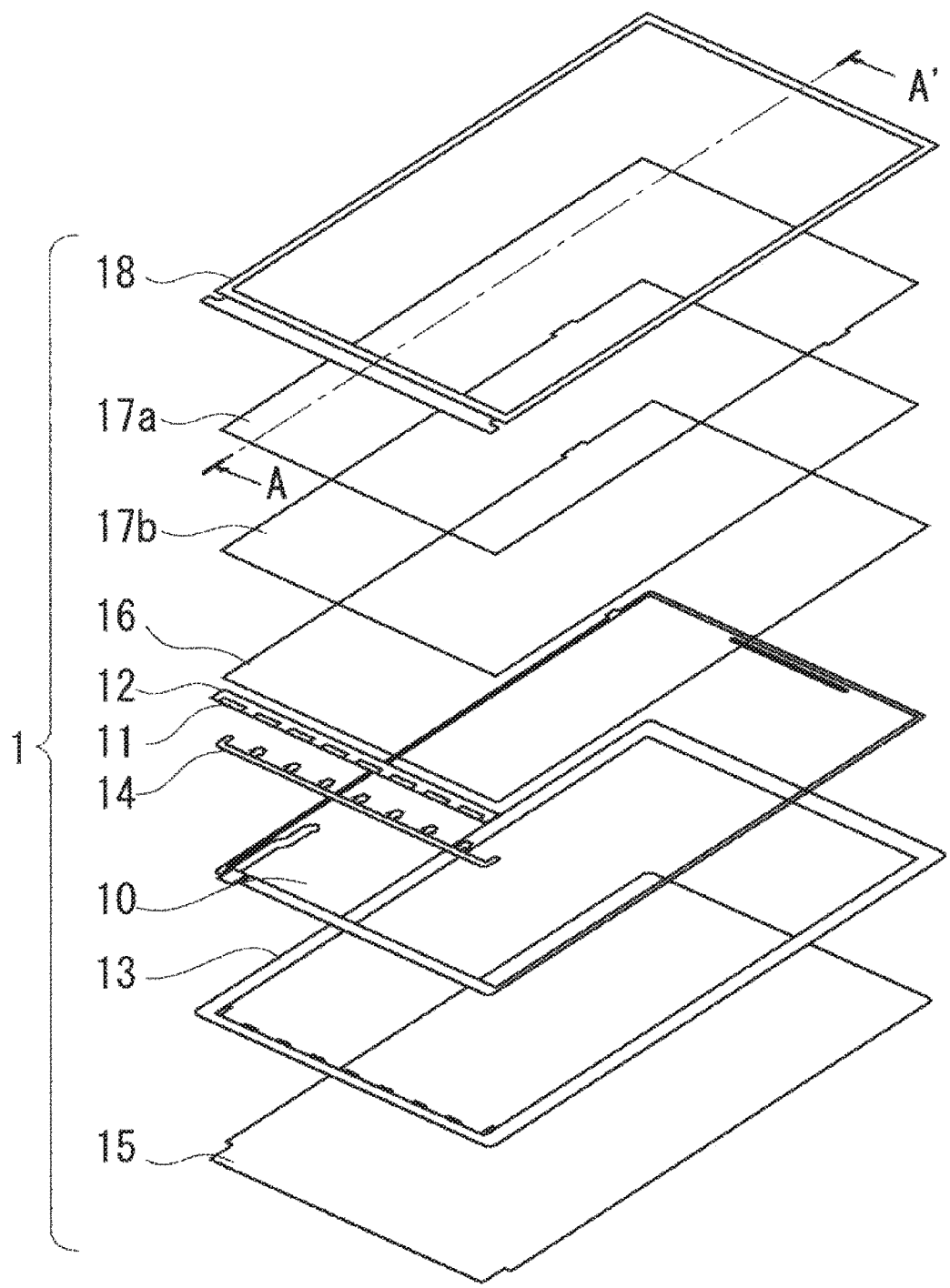
FIG. 1 is a perspective view illustrating the basic structure of a plane light source device.

FIG. 1 is a perspective view illustrating the basic configuration of a plane light source device 1. The plane light source device 1 includes a light-guiding panel (a light guide) 10, multiple light sources 11, a flexible printed circuit board (hereinafter as the "FPC") 12, a frame 13, and a fixing member 14. The plane light source device 1 further includes a reflecting sheet 15 provided on the lower surface side of the light-guiding panel 10. The plane light source device 1 includes a diffusion sheet 16, prism sheets 17a and 17b, and a light-shielding sheet 18 layered upon each other on the upper surface side of the light-guiding panel 10.

The light-guiding panel 10 has a substantially plate shape and is made of a translucent material such as a polycarbonate resin and a polymethyl methacrylate resin. The upper surface of the light-guiding panel 10 serves as a light-emitting surface (also referred to as a "light exit surface") from which light is emitted. The light-guiding panel 10 guides light introduced into the light-guiding panel 10 from the light sources 11 to the light emitting surface using total reflection, so that the entire light-emitting surface lights substantially uniformly.

The light source 11 is for example an LED light source which emits white light. Note however that the light source may be an LED light source other than a white LED light source or a light source other than an LED light source or may include light sources in multiple colors (such as RGB). The light source 11 is mounted to the FPC 12 and supplied with electric power from the FPC 12 to be driven. According to the embodiment, eight light sources 11 are aligned in a line at equal intervals along a short side (referred to as a "first side") of the light-emitting surface of the light-guiding panel 10.

The frame 13 is a member having an opening and a frame shape consisting of four sides. The frame 13 is made for example of a polycarbonate resin containing titanium oxide. The light-guiding panel 10 is fitted to the frame 13, and the inner peripheral surface of the frame 13 surrounds side surfaces which form the outer peripheral surface of the light-guiding panel 10. The frame 13 has a high reflectance and reflects light so that light in the light-guiding panel 10 does not leak from the outer peripheral surface of the light-guiding panel 10. A storing part for storing the light sources 11 is provided at one side of the frame 13, and the storing part is provided with a reflecting wall which reflects light from the light sources 11.

The fixing member 14 is provided for example at the lower surface of the FPC 12 to fix the FPC 12, the frame 13, and the light-guiding panel 10. The fixing member 14 is for example a length of double-side adhesive tape having upper and lower adhesive surfaces but it may be any other material. The reflecting sheet 15 is a flat and smooth sheet of a white resin sheet or a metal foil with a high reflectance and reflects light so that light inside the light-guiding panel 10 does not leak from the lower surface of the light-guiding panel 10. The diffusion sheet 16 is a translucent resin film and diffuses light emitted from the light-emitting surface of the light-guiding panel 10 so that the directivity of the light is increased. The prism sheets 17a and 17b are each a transparent resin film provided with a very fine triangular prism-shaped pattern on the upper surface thereof, collect light diffused by the diffusion sheet 16, and increases the luminance when the plane light source device 1 is seen from the upper surface side. The light-shielding sheet 18 is a black adhesive sheet having upper and lower adhesive surfaces. The light-shielding sheet 18 is frame-shaped and reduces light leakage.

(Streak-Like Region)

Figure 2:
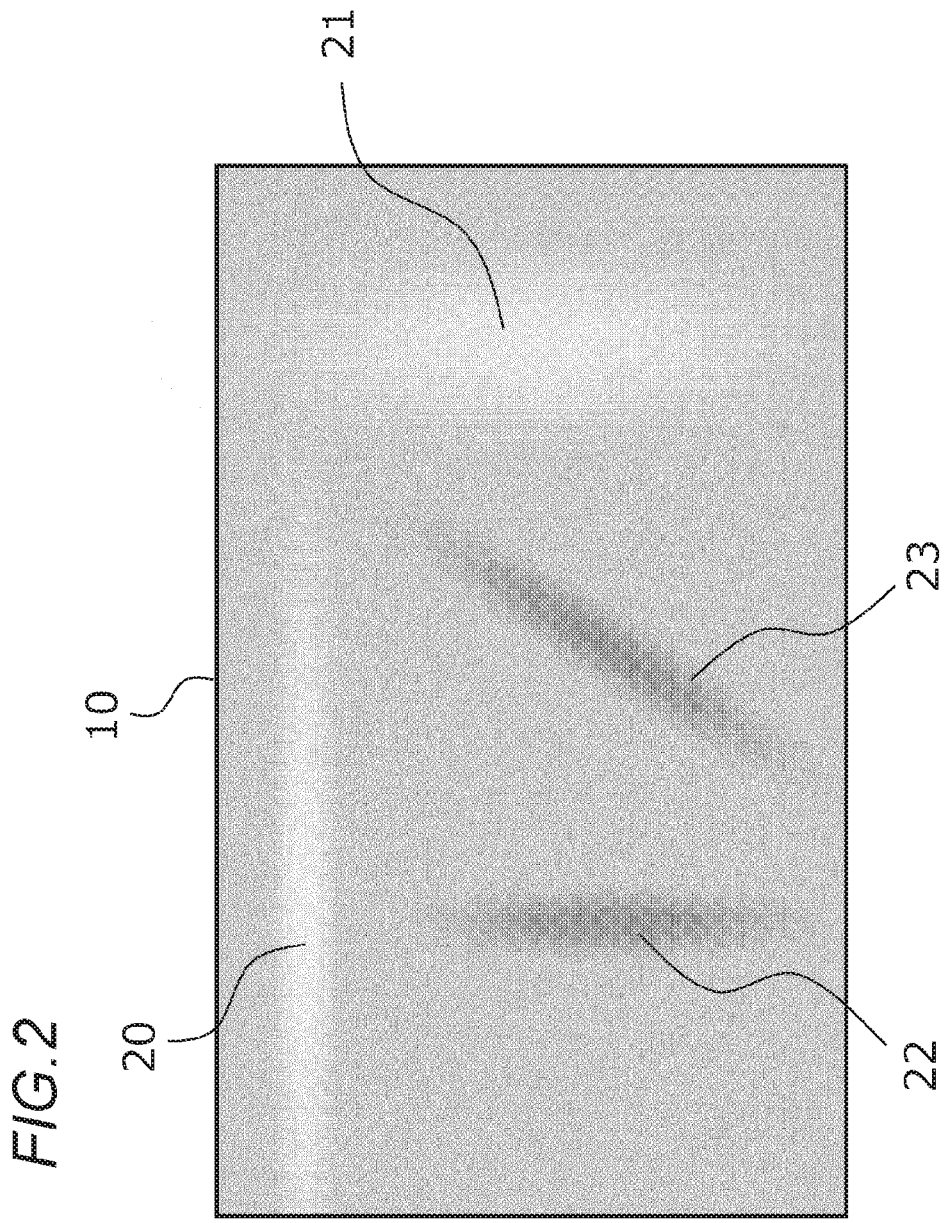
FIG. 2 is a view of an example of a streak-like region.

The edge-lit type plane light source device shown in FIG. 1 may be encountered with a failure related to luminance unevenness attributable to various causes such as a defect in a mold for the light-guiding panel 10 or poor molding thereof, shifting during assembly of various components, and shifting in adhering sheets 15 to 18 together. One such failure is a linearly extending streak-like region. FIG. 2 schematically shows an example of the streak-like region. The streak-like region has bright regions (20 and 21) having relatively high luminance with respect to the surrounding region and dark regions (22 and 23) having relatively low luminance with respect to the surrounding region. There are a longitudinal streak (22) extending in parallel to a long side of the light-emitting surface of the light-guiding panel 10 and lateral streaks (21 and 22) extending in parallel to a short side of the light-emitting surface of the light-guiding panel 10, and an oblique streak (23) extending obliquely.

(Inspecting Device)

Figure 3:
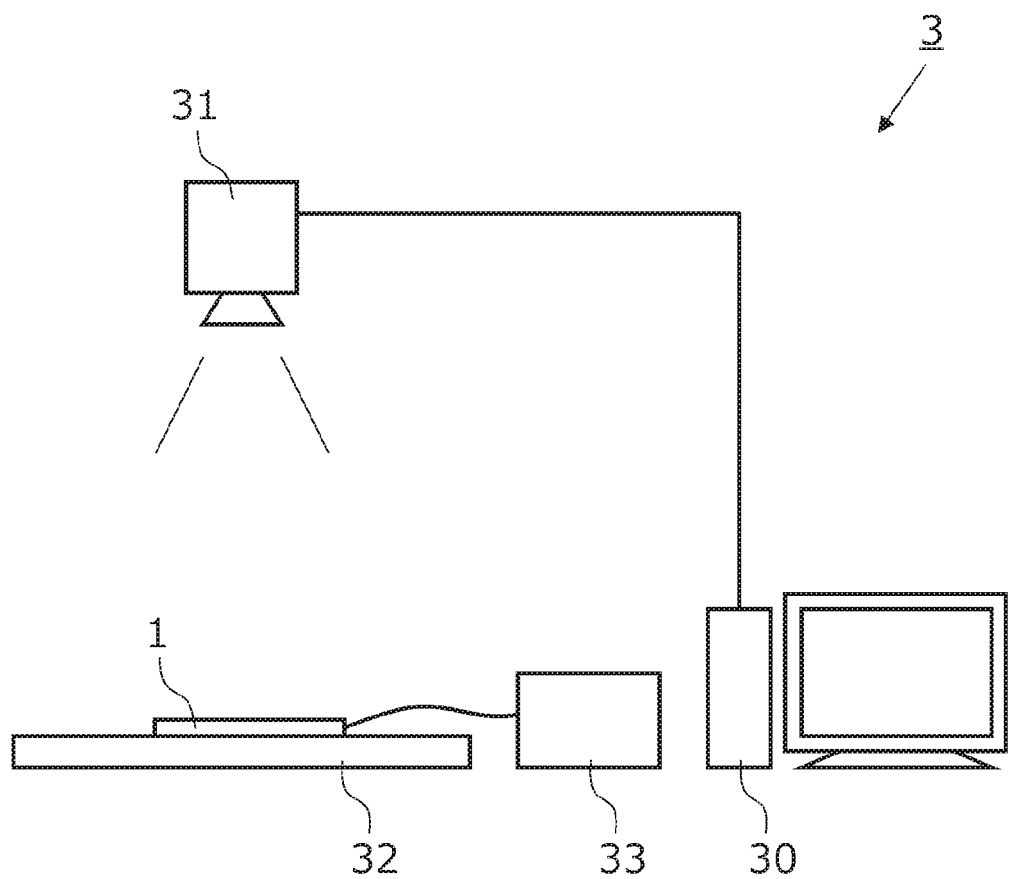
FIG. 3 is a view illustrating the hardware configuration of an inspecting device.

With reference to FIG. 3, the structure of an inspecting device 3 which includes a streak-like region detecting device according to the embodiment of the present invention will be described. FIG. 3 is a view showing the hardware configuration of the inspecting device 3. The inspecting device 3 quantitatively evaluates the occurrence degree of a streak-like region in the plane light source device 1 and automatically determines the presence/absence of a streak-like region which necessitates removal as a defective product.

As shown in FIG. 3, the inspecting device 3 substantially includes an information processing device (computer) 30, an imaging device 31, a stage 32, and a constant current power source 33. The information processing device 30 includes a general-purpose or dedicated computer which has a CPU (central processing unit) as a hardware processor, a memory as a main storage, a storage device for storing programs or data in a non-transitory manner (such as a hard disk and a flash memory), an input device (such as a mouse device, a keyboard, and a touch panel), a display device, an interface with the imaging device 31, and a network interface.

The imaging device 31 is a device which photographs the plane light source device 1 placed on the stage 32 and outputs a digital image. The imaging device 31 may be an optical system, an imaging element, or a digital camera which has an interface with the information processing device 30. Since the process is for the purpose of measuring the luminance of the plane light source device 1, the camera may be a monochrome camera if the plane light source device 1 is a monochromatic light source, and the camera is preferably a color camera if the plane light source device 1 is a multi-color light source device. The plane light source device 1 to be inspected is placed on the stage 32. The constant current power source 33 is a device which supplies the plane light source device 1 with electric power. Although not shown, the imaging device 31 and the stage 32 may be provided in a clean bench.

The size (the length and width) of the light-emitting surface or the light emission luminance may be different among different models of the plane light source devices 1. Therefore, depending on the size of the light-emitting surface to be inspected, the distance between the stage 32 and the imaging device 31 or the zoom of the imaging device 31 is preferably adjusted, so that the relation between one pixel of an image obtained by the imaging device 31 and an actual size on the light emitting surface is calibrated. The average luminance of an image obtained by the imaging device 31 is preferably calibrated by adjusting the exposure time of the imaging device 31 depending on the light emitting luminance of the test object. These kinds of calibration may be carried out automatically by the information processing device 30 or manually by an operator.

Figure 4:
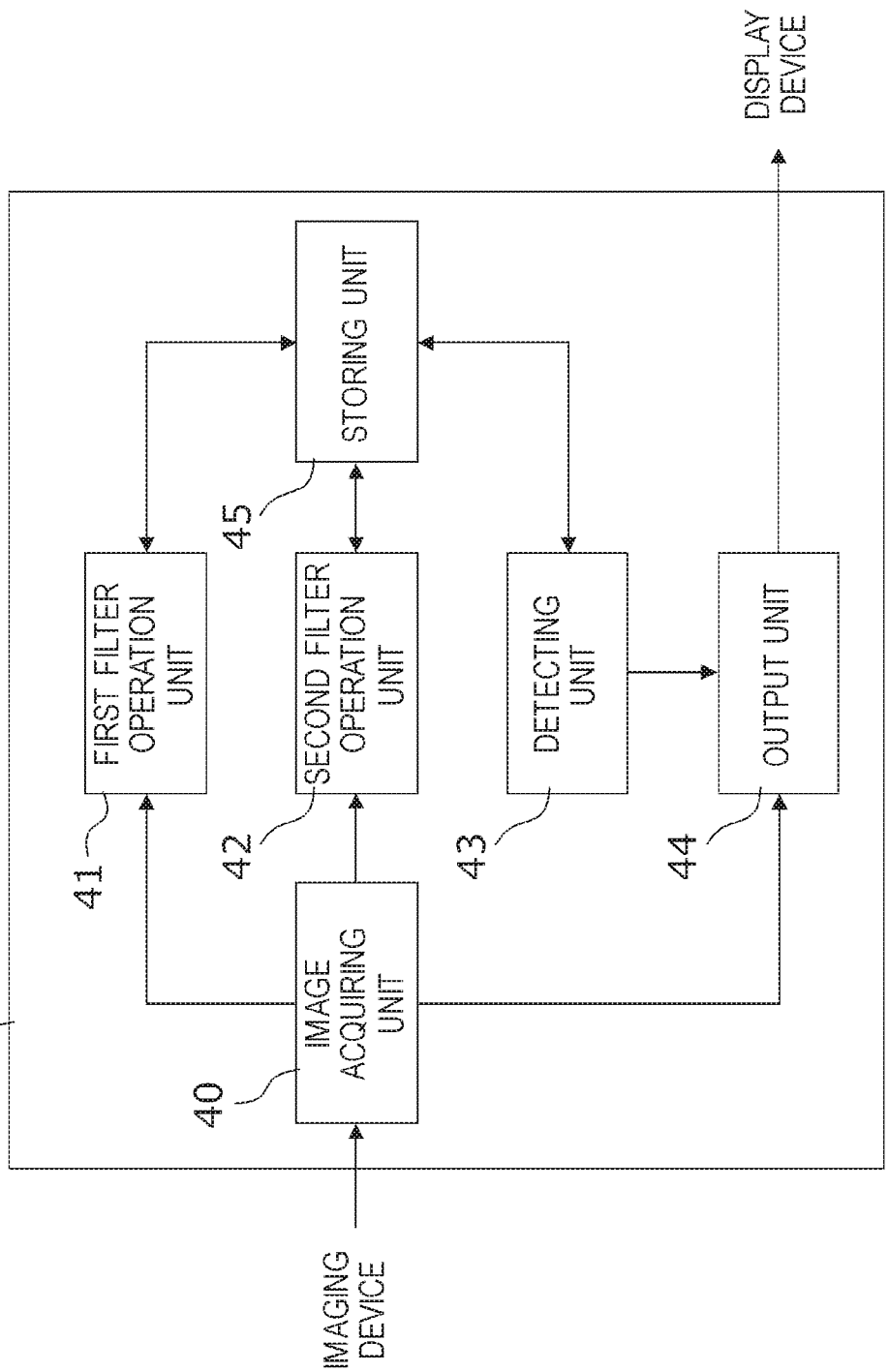
FIG. 4 is a block diagram illustrating functions related to streak-like region detecting processing by the inspecting device.

FIG. 4 is a block diagram illustrating functions related to streak-like region detecting processing by the inspecting device 3. The inspecting device 3 includes an image acquiring unit 40, a first filter operation unit 41, a second filter operation unit 42, a detecting unit 43, an output unit 44, and a storing unit 45. The image acquiring unit 40 represents the function of obtaining, from the imaging device 31, image data acquired by photographing the plane light source device 1 for inspection. The first and second filter operation units 41 and 42 represent the function of carrying out filtering operation. The detecting unit 43 represents the function of detecting a streak-like region using filter response values obtained by the first and second filter operation units 41 and 42. The output unit 44 represents the function of outputting image data and information such as a result of inspection to the display device. The storing unit 45 represents the function of storing the filters used for inspection processing, a determination threshold value, response values, and evaluation values. These functions will be described in detail.

The function shown in FIG. 4 is basically implemented as the CPU of the information processing device 30 loads necessary programs from the storing device and executes the programs. Note however that some or all of the functions may be substituted by a circuit such as an ASIC and an FPGA. Some or all of these functions may be executed by another computer by using cloud computing or distributed computing techniques.

(Filters)

With reference to FIGS. 5A to 5D and FIGS. 6A to 6D, the characteristics of the filters used for streak-like region detecting processing according to the embodiment will be described. FIGS. 5A to 5D illustrate a conventional method, while FIGS. 6A to 6D show the filters according to the embodiment.

Figure 5A:
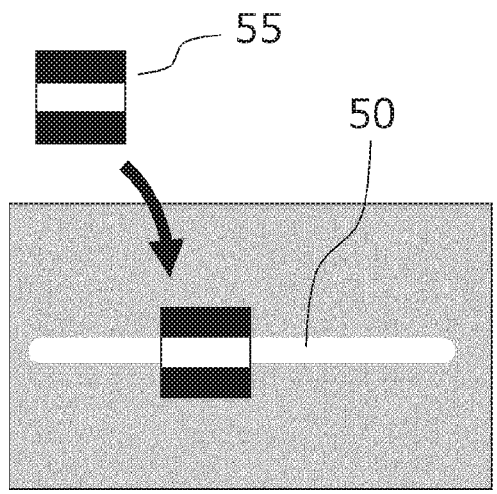
FIGS. 5A to 5D are views of filters used according to a conventional method.
Figure 5B:
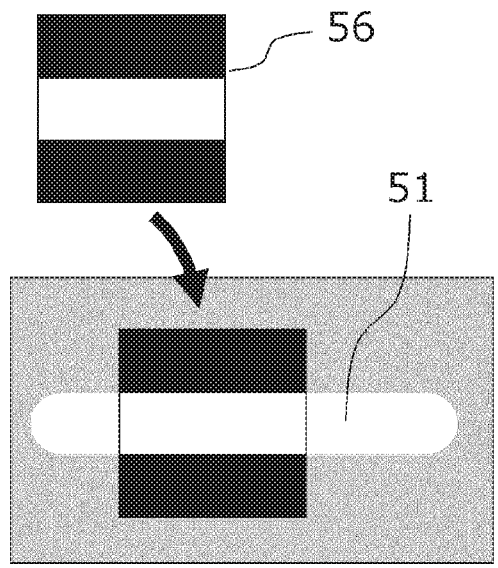

According to the conventional method, the filter (the size and coefficient of the kernel) must be changed according to the width of a streak-like region intended to be detected. FIG. 5A is a schematic view of a kernel 55 for detecting a bright region 50 having a small width, and FIG. 5B is a schematic view of a kernel 56 for detecting a bright region 51 having a large width. Note that the black region in the kernel represents a negative coefficient (such as "−1") while the white region represents a positive coefficient (such as "+1"). These filters most strongly respond when the coefficient distribution of the kernel and the luminance distribution of a streak-like region match, in other words, when the width of the white region in the kernel and the width of the streak-like region match (the response value for the filter is maximized).

Figure 5C:
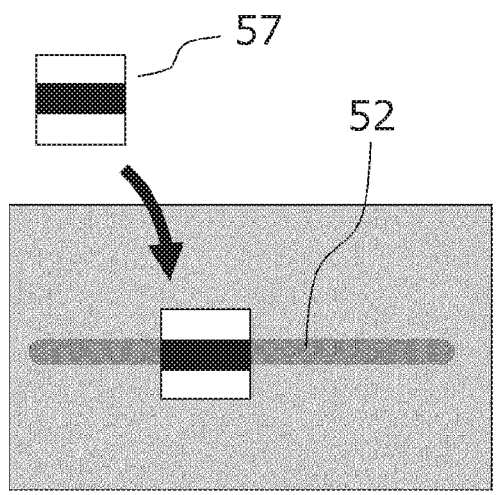
Figure 5D:
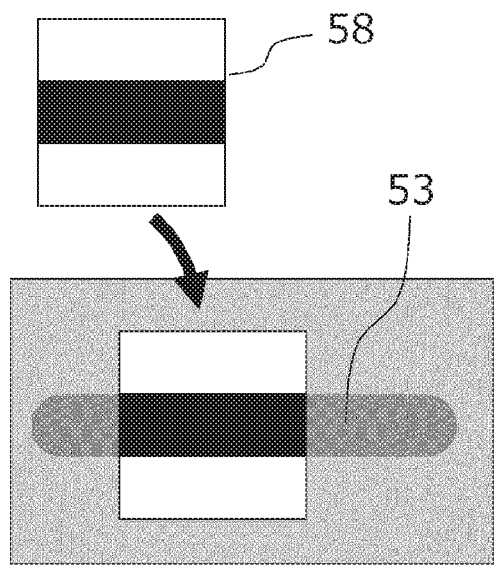

According to the conventional method, the filter must be changed between a bright region and a dark region. FIGS. 5C and 5D show kernels 57 and 58 corresponding to the widths of the dark regions 52 and 53, respectively. The kernels 57 and 58 for the dark regions have the coefficients with the sign inverted from that of the kernel 55 and 56 for the bright regions.

Figure 6A:
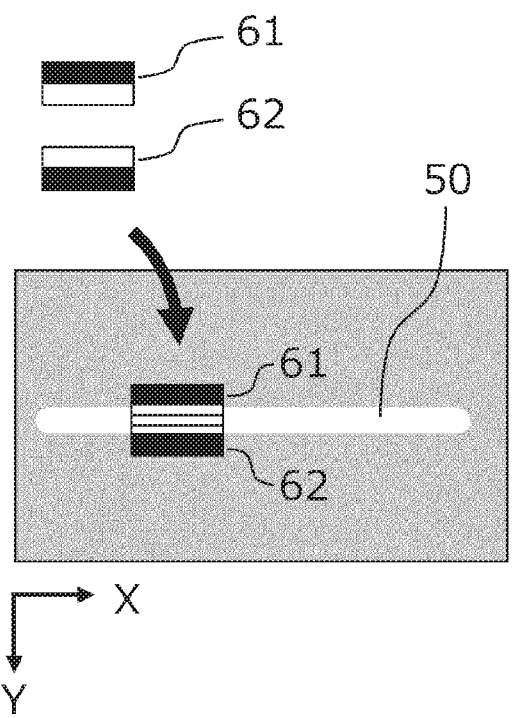
FIGS. 6A to 6D are views of filters used according to an embodiment of the present invention.
Figure 6B:
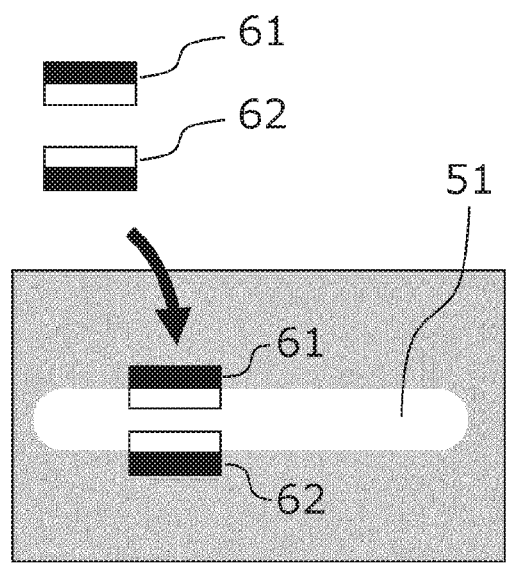
Figure 6C:
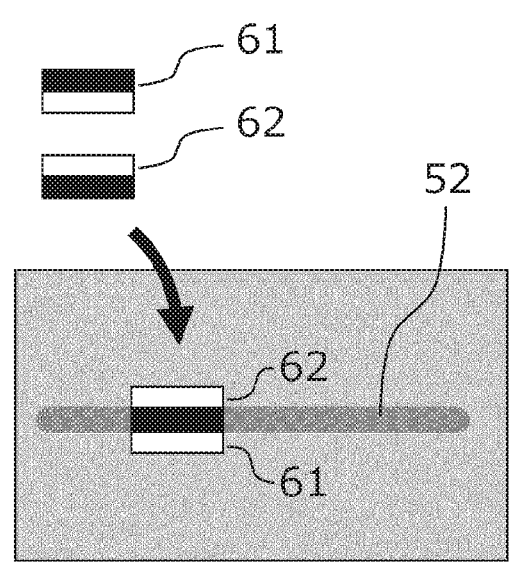
Figure 6D:
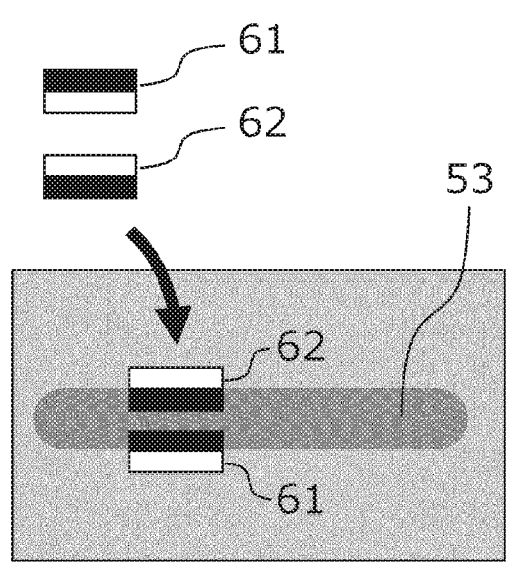

In contrast, as shown in FIGS. 6A to 6D, according to the embodiment, two filters are combined to detect a streak-like region. For example, it is assumed that a streak-like region extends in the X-direction of an image (rightwards in FIG. 6A). In this case, two filters, in other words, a first filter 61 responsive to increase in the luminance in the Y-direction (downwards in FIG. 6A) and a second filter 62 responsive to decrease in the luminance in the Y-direction are used. The first filter 61 responds only to one edge of a streak-like region (which has luminance changing from low to high in the Y-direction), and the second filter 62 responds only to the other edge of the streak-like region (which has luminance changing from high to low in the Y-direction). Therefore, using an integrated value obtained by integrating a response value from the first filter 61 and a response value from the second filter 62 (such as the total value of two response values or the average of the values), a streak-like region having a width corresponding to the Y-distance (referred to as the "filter interval") between the two filters 61 and 62 can be detected. For example, when a bright region 50 having a small width is to be detected, the filter interval may be small as shown in FIG. 6A, while when a bright region 51 having a large width is to be detected, and the filter interval may be large as shown in FIG. 6B. Furthermore, as shown in FIGS. 6C and 6D, the positional relation between the first and second filters 61 and 62 may be reversed, so that dark regions 52 and 53 may be detected.

As described above, according to the conventional method, multiple filters must be prepared corresponding to the widths of streak-like regions and on the basis of whether the region is a dark region or a bright region, while according to the embodiment, a bright region and a dark region with an arbitrary width may be detected using the two filters 61 and 62.

Note that the kernel size and coefficient of each of the filters may be set, as appropriate, depending on the width, the length, the luminance distribution, and the direction of an expected streak-like region. For example, FIG. 7A shows an exemplary filter for detecting a longitudinal streak and has a length of 30 mm (in the X-direction) and a width of 10 mm (in the Y-direction). When the image has a resolution of 0.1 mm/pix, the kernel size is 300 pix×100 pix. A first filter 71 has a negative value (such as "−1") as the coefficient of the upper half and a positive value (such as "+1") as the coefficient of the lower half. A second filter 72 is the inverse of the first filter 71 in the vertical direction and has a positive value as the coefficient of the upper half and a negative value as the coefficient of the lower half. Note that the coefficients within the white and black regions do not have to be fixed values and may have a gradient. FIG. 7B shows examples of first and second filters 73 and 74 for detecting a lateral streak, and FIG. 7C shows examples of first and second filters 75 and 76 for detecting an oblique streak.

(Inspection Processing)

Figure 8:
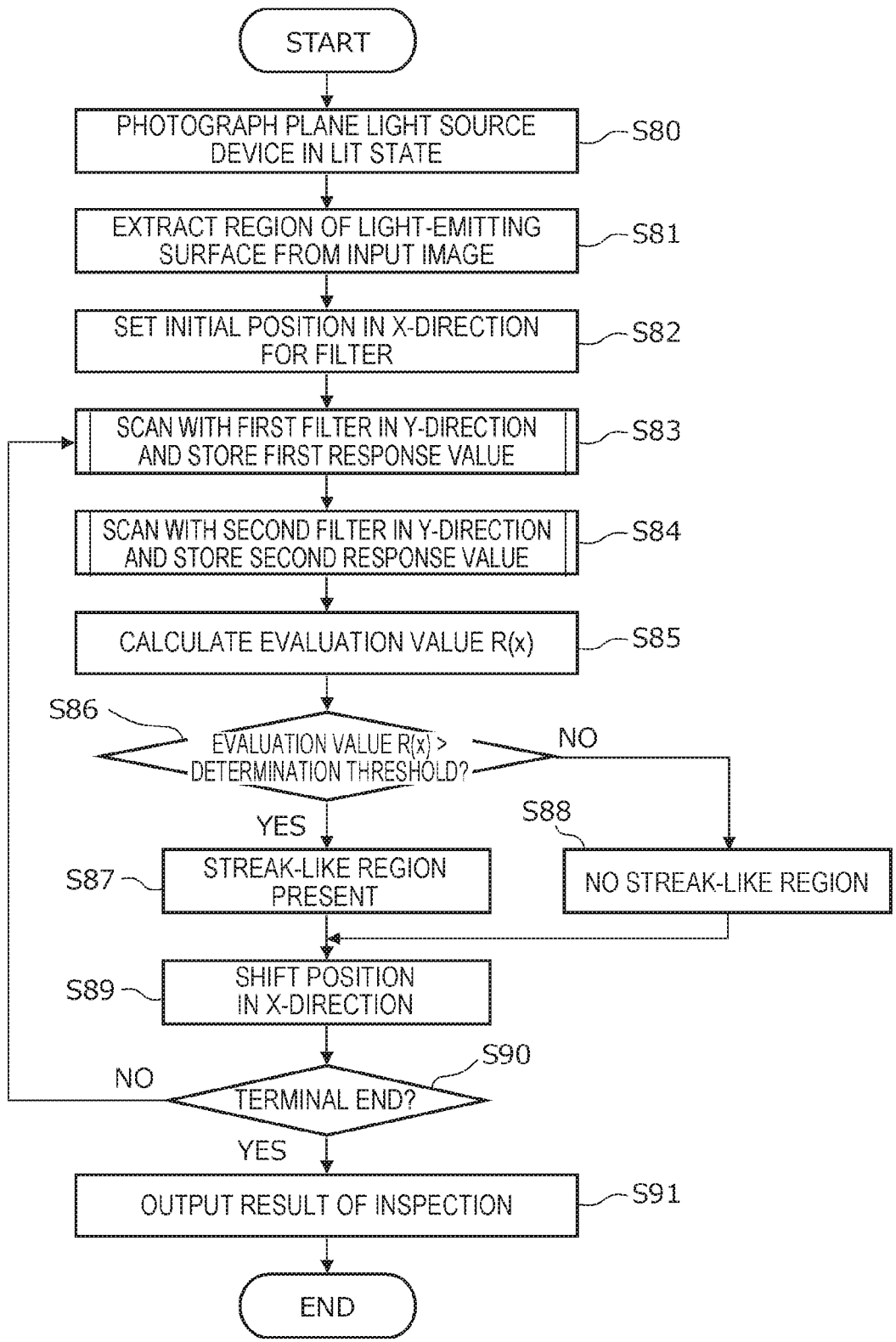
FIG. 8 is a flowchart for illustrating processing for inspecting for a longitudinal streak according to a first embodiment of the invention.

The flow of inspection processing for a longitudinal streak will be described by referring to the flowchart in FIG. 8. Note that the filters 71 and 72 in FIG. 7A are used according to the embodiment.

To start with, an inspector provides the plane light source device 1 on the stage 32 in a prescribed position so that the light-emitting surface faces the side of the imaging device 31. The plane light source device 1 is connected to the constant current power source 33 to drive the light sources 11, and the plane light source device 1 is lit. Note that the test object is provided manually in the inspecting device 3 according to the embodiment, while operation such as introduction, positioning, and connection with the power source, and withdrawal of the test object may be automated.

In step S80, the imaging device 31 photographs the plane light source device 1 in the lit state, and the image acquiring unit 40 takes in image data from the imaging device 31. The resolution of the image is arbitrary while according to the embodiment, the image has a resolution of about 0.1 mm (an actual size on the light-emitting surface) per pixel.

In step S81, the image acquiring unit 40 extracts only the region of the light-emitting surface from the input image taken in step S80. Hereinafter, the image of the extracted region of the light-emitting surface will be referred to as a "light-emitting surface image." FIG. 9A illustrates an example of an input image 90, and FIG. 9B illustrates an example of the light-emitting surface image 91 extracted from the input image 90. According to the embodiment, the light-emitting surface image 91 is generated so that the long sides of the light-emitting surface are parallel with the X-axis of the image. The reference numeral 92 indicates a longitudinal streak (a bright region).

The light-emitting surface region may be extracted by any method. For example, the image acquiring unit 40 may (1) binarize the original image, (2) remove noises in the background region (the region other than the light-emitting surface) by closing processing, and then (3) extract the contour of the light-emitting surface. Furthermore, when the contour of the light-emitting surface is inclined with respect to the image coordinate system, inclination correction (rotational correction) may be carried out. Alternatively, if the test object is positioned sufficiently accurately on the stage, it may only be necessary to cut a prescribed range from the original image.

In step S82, an initial value (for example X=15 mm) is set in an X-position of the filters 71 and 72. In step S83, the first filter operation unit 41 carries out scanning using the first filter 71 in the Y-direction and calculates a response value (referred to as a "first response value") by the first filter 71 in each of Y-positions.

Figure 10:
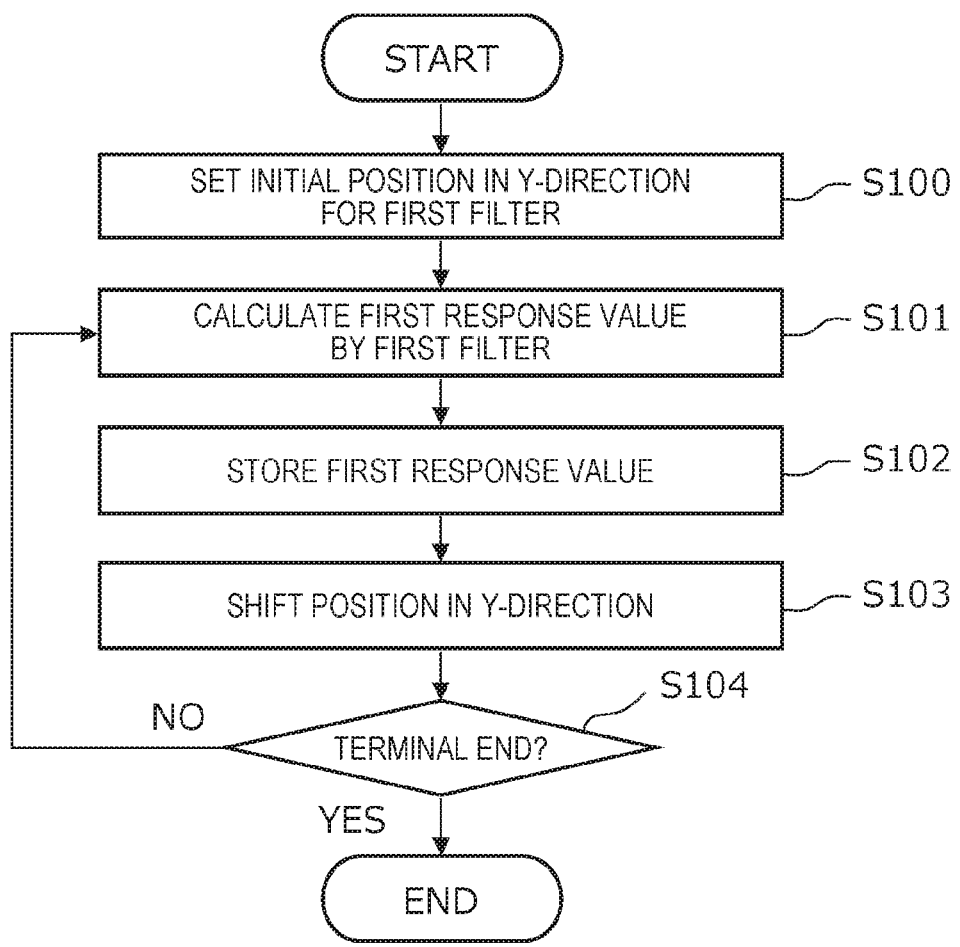
FIG. 10 is a flowchart for illustrating processing by a first filter operation unit.

FIG. 10 shows the flow of step S83 in detail. To start with, the first filter operation unit 41 sets an initial value (for example Y=5 mm) in a Y-position of the first filter 71 (step S100). Then, the first filter operation unit 41 applies the first filter 71 to an image region around the set X-position and Y-position and calculates a first response value by the first filter 71 (step S101). The first response value is a result of sum-of-product arithmetic calculation of pixel values corresponding to the coefficient of the first filter 71. If the result of sum-of-product arithmetic operation is a negative value, the response value may be set to zero. The calculated first response value is stored in the storing unit 45 together with information on the application position (the X-position and the Y-position) of the first filter 71 (step S102). Thereafter, as the Y-position of the filter is shifted by one pixel (step S103), the processing from steps S101 to S102 is repeated until the filter reaches the terminal end of the inspection range in the Y-direction (step S104). Note that the inspection range may be the entire light-emitting surface image 91 or a part of the light-emitting surface image 91 (if for example the area expected to have a longitudinal streak is previously known).

In step S84, the second filter operation unit 42 carries out scanning using the second filter 72 in the Y-direction and calculates a response value (referred to as a second response value) in each of Y-positions by the second filter 72. The processing in step S84 is identical to the processing in step S83 except that the different filter is used. The second response value calculated in step S84 is stored in the storing unit 45 together with information on the application position of the second filter 72.

In step S85, the detecting unit 43 calculates a maximum value R(x) for the integrated value of the first and second response values for example by the following expression. The value of R(x) is a value obtained by quantifying the occurrence degree of a streak-like region in an X-position x and will be hereinafter referred to as a "streak-like region evaluation value".

$$R(x) = \max_{i,j \in \Omega; |i-j| \geq m} \{R_1(x, i) + R_2(x, j)\} \qquad [\text{Math. 1}]$$

where $R_1(x, i)$ is a first response value in the X-position x and a Y-position i, $R_2(x, j)$ is a second response value in an X-position x and a Y-position j. $\Omega$ is an inspection range in the Y-direction. In addition, m is the width of a white region (or a black region) in the kernels of the filters 71 and 72 in the Y-direction, and $|i-j|$ is the absolute value of the difference between i and j or the filter interval. The condition expressed by $|i-j| \geq m$ indicates that the white region of one filter does not overlap the black region of the other filter.

The above expression indicates that a combination of first and second response values which gives a maximum value R(x) for the integrated value is selected from multiple first response values $R_1(x, i)$ and multiple second response values $R_2(x, j)$ which are obtained in the X-position x by shifting (scanning using) the two filters 71 and 72 in the Y-direction.

Note that according to the above expression, both a bright region and a dark region can be detected because both cases in which the first filter 71 is positioned above as shown in FIGS. 6A and 6B and the second filter 72 is positioned above as shown in FIGS. 6C and 6D are taken into account. More specifically, if a combination of i and j which gives a streak-like region evaluation value R(x) satisfies i<j, the region is a bright region, and if the combination satisfies i>j, the region is a dark region. Note that in order to detect only a bright region, the restriction expressed by i<j may be added in the above expression, while in order to detect only a dark region, the restriction expressed by i>j may be added in the above expression.

In step S86, the detecting unit 43 compares the streak-like region evaluation value R(x) obtained in step S85 to a determination threshold value. The determination threshold value is used to determine the presence/absence of a streak-like region and may be predetermined depending on a result of sensory inspection or a result of experiments. The detecting unit 43 determines that "a streak-like region is in the position x" if the streak-like region evaluation value R(x) is greater than the determination threshold value (step S87) and otherwise determines that "no streak-like region exists in the position x" (step S88).

Thereafter, while the X-position of the filter is shifted by 5 mm (by 50 pixels) (step S89), the processing from steps S83 to S89 is repeated until the filter reaches the terminal end of the inspection range in the X-direction (step S90). Note that the inspection range may be the entire light-emitting surface image 91 or a part of the light-emitting surface image 91 (if for example the area expected to have a longitudinal streak is previously known).

Figure 11:
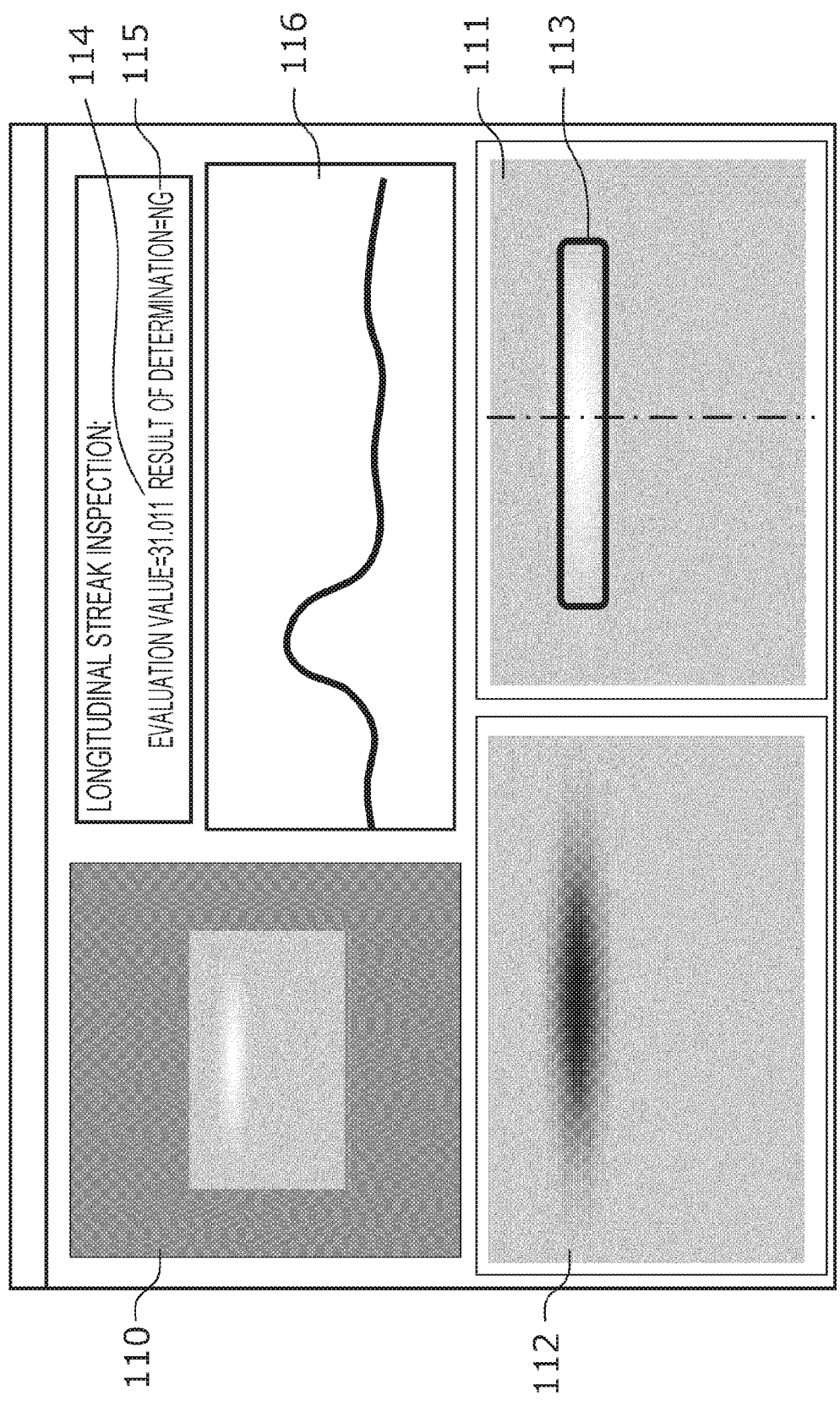
FIG. 11 is a view of an example of an output screen image of a result of inspection.

In step S91, the output unit 44 produces a screen image for outputting information obtained by the detecting unit 43 and outputs the screen image to the display device. FIG. 11 illustrates an example of the output screen image as a result of inspection. The output screen image includes an input image 110 taken from the imaging device 31, a light-emitting surface image 111 cut from the input image 110, and an image 112 (such as a pseudo color image) in which the light-emitting surface image 111 is processed to make luminance unevenness more noticeable. The light-emitting surface image 111 is superposed with information 113 indicating a position in which a streak-like region appears (for example a frame delineating an image region in which the streak-like region evaluation value R(x) exceeds the determination threshold value). The screen image also includes a maximum value max R(x) 114 for the streak-like region evaluation value, its determination result 115, and a luminance profile 116 in the Y-direction in the X-position in which the maximum max value max R(x) for the streak-like region evaluation value is obtained (the chain-dotted line in FIG. 11).

Using the inspecting device 3 according to the embodiment, an evaluation value representing the occurrence degree of a streak-like region is calculated on the basis of a photographed image of the light-emitting surface of the plane light source device 1, and the presence/absence of a streak-like region can be determined on the basis of the evaluation value. Therefore, objective and automatic inspection for streak-like regions may be performed. Since a streak-like region with an arbitrary width can be detected using only two filters, a lot of filters do not have to be prepared in advance unlike the conventional method. Therefore, the man-hours in designing the filters and the memory capacity for the filters can be considerably reduced.

Furthermore, scanning is carried out once for each of the first and second filters, and after first and second response values in each application position are stored in the storing unit, the combination of the first and second response values is changed and an integrated value is calculated, so that the occurrence degree of a streak-like region with an arbitrary width in an arbitrary position can be evaluated. With the algorithm, the amount of filter operation necessary for detecting multiple kinds of streak-like regions with different widths may be greatly reduced as compared to the amount which would be necessary by the conventional method (which uses multiple filters corresponding to widths to be detected). Therefore, the method according to the present invention provides an advantageous effect in that the time for processing can be shorter than the conventional method when two or more kinds of streak-like regions are to be detected or the width of a streak-like region is indefinite.

Since the result of inspection shown in FIG. 11 is output, the inspector can immediately determine the presence/absence of a streak-like region or whether the plane light source device 1 is good or defective. The streak-like region evaluation value is also output, and therefore the reason for the result of determination can be checked, so that convincingness and objectivity about the result of determination may improve. The light-emitting surface image 111 is superposed with information 113 which indicates the position of a streak-like region, which allows the inspector to grasp the position of interest with the streak-like region intuitively and more easily, which is also useful in checking the actual product. More specifically, the luminance profile 116 is also displayed, so that the state of the streak-like region (the difference in luminance with respect to the surrounding region) may be understood.

Second Embodiment

Now, a second embodiment of the present invention will be described. According to the first embodiment, the streak-like region evaluation value is obtained for each X-position of a filter, while according to the second embodiment, a streak-like region evaluation value is obtained for each filter interval (i.e., for each width of a streak-like region). The other features are identical to those of the first embodiment, and therefore only the features and processing specific to the second embodiment will be described.

Figure 12:
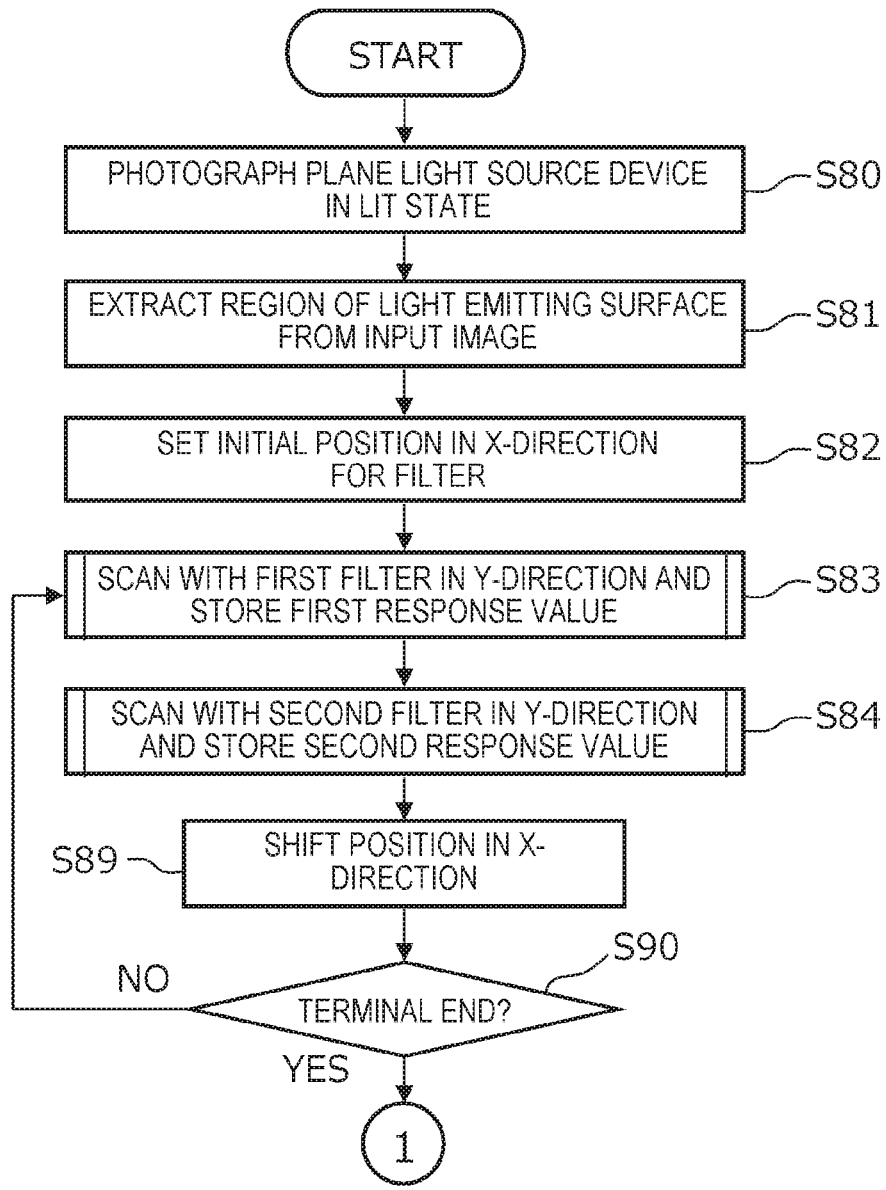
FIG. 12 is a flowchart for illustrating processing for inspecting for a longitudinal streak according to a second embodiment of the invention.
Figure 13:
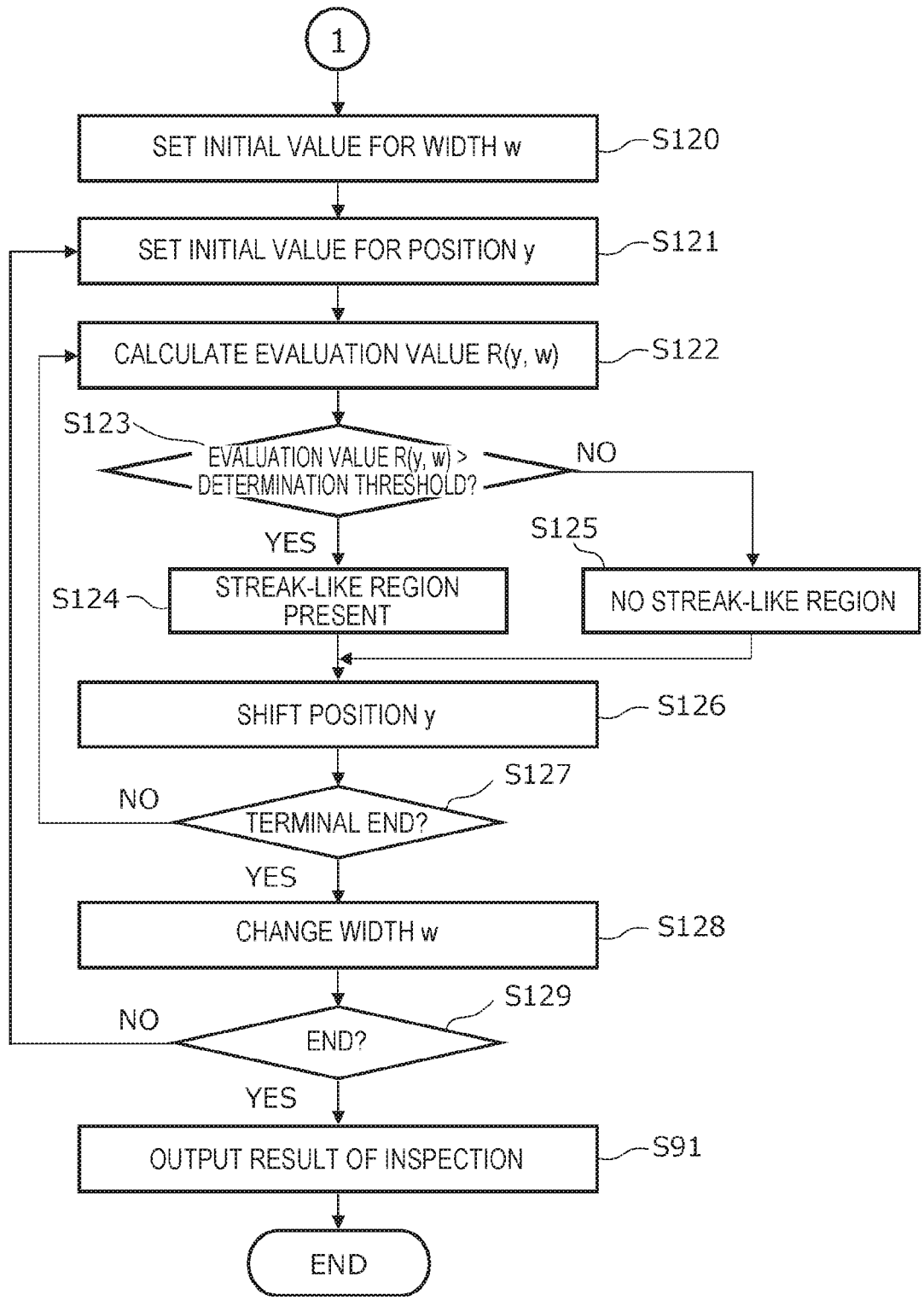
FIG. 13 is a flowchart for illustrating processing for inspecting for a longitudinal streak according to the second embodiment.

FIGS. 12 and 13 are flowcharts for illustrating inspection processing for a longitudinal streak according to the second embodiment. Using the filters 71 and 72, scanning is carried out in the Y-direction and the X-direction through the processing in steps S80 to S84, S89, and S90, and first and second values in each of the X-positions and each of the Y-positions within the inspection range are calculated and stored in the storing unit 45. These kinds of processing are identical to the processing steps indicated by the same numbers in the flowchart in FIG. 8 according to the first embodiment.

Then, a streak-like region evaluation value for each width is calculated. According to the embodiment, a streak-like region evaluation value is obtained when the width w is 4 mm, 6 mm, 8 mm, and 10 mm by way of illustration.

In step S120, the detecting unit 43 sets an initial value of 4 mm for the width w. In step S121, the detecting unit 43 sets an initial value of for example 5 mm for a Y-position y.

In step S122, the detecting unit 43 calculates a streak-like region evaluation value R(y, w) for example by the following expression. The value of R(y, w) is a value obtained by quantifying the occurrence degree of a streak-like region having a width w in the Y-position y.

$$R(y, w) = \sum_{k \in \Theta} \{R_1(k, y) + R_2(k, y + w)\} \qquad \text{[Math. 2]}$$

where $R_1(k, y)$ is a first response value in an X-position k and a Y-position y, $R_2(k, y+w)$ is a second response value in an X-position k and a Y-position y+w. $\Theta$ is an inspection range in the X-direction.

The above expression indicates that a value R(y, w) is calculated and the value is obtained by integrating multiple first response values $R_1(k, y)$ and multiple second response values $R_2(k, y+w)$ which are obtained by shifting (scanning using) the two filters 71 and 72 in the X-direction while the Y-positions of two filters 71 and 72 and the filter interval are kept constant.

In step S123, the detecting unit 43 compares the streak-like region evaluation value R (y, w) obtained in step S122 to a determination threshold value. The detecting unit 43 determines that "a streak-like region with a width w is in the position y" if the streak-like region evaluation value R(y, w) is greater than the determination threshold value (step S124)

and otherwise determines that "no streak-like region with the width w exists in the position y" (step S125).

Thereafter, the processing from steps S122 to S125 is repeated until the value of y reaches the terminal end of the inspection range in the Y-direction (S127) while y is shifted by one pixel (step S126). Then, as the width w is increased by 2 mm (step S128), the processing from steps S121 to S127 is repeated until the value w reaches 10 mm (step S129). In this way, the detection processing for the streak-like regions with widths w of 4 mm, 6 mm, 8 mm, and 10 mm ends. The processing thereafter is identical to that of the first embodiment.

The streak-like region evaluation value R(y, w) is greater as a bright region or a dark region extending in the X-direction is longer. Therefore, a streak-like region (a longitudinal streak) extending in the X-direction can be detected accurately by evaluating the occurrence degree of a streak-like region using the evaluation value R(y, w).

Note that according to the embodiment, an evaluation value R(y, w) is obtained for each combination of a Y-position y and a width w. This method is advantageous in that all the longitudinal streaks appearing in an image can be detected. Meanwhile, if it is sufficient to detect/evaluate a longitudinal streak most intensely appearing in an image, an evaluation value R(w) or an evaluation value R as in the following expression may be used. The evaluation value R(w) is a value obtained by quantifying the occurrence degree of a streak-like region having a width w, and the evaluation value R is a value obtained by quantifying the occurrence degree of a streak-like region having an arbitrary width.

$$R(w) = \max_{y \in \Omega} R(y, w) \qquad \text{[Math. 3]}$$

$$R = \max_{w} R(w)$$

<Other Matters>

The description of the embodiments is only for the purpose of illustrating the present invention. The invention is not limited by the above specific embodiments, and various modifications can be made within the scope of technical ideas of the invention. For example, in the description of the embodiments, the plane light source device having a rectangular light-emitting surface is illustrated by way of example, while the shape of the light-emitting surface may be any other shape than the rectangular shape. The streak-like region evaluation value is only an example, and if the value is obtained by integrating the first response values by the first filter and the second response values by the second filter, the value may be designed in any other way. In the description of the embodiments, the detecting processing for a longitudinal streak-like region is illustrated, while it should be understood that the kernels and the scanning directions of the filters may be changed, as appropriate, so that a lateral streak or an oblique streak can be detected. Naturally, two or more kinds of streak-like regions among the longitudinal streak, the lateral streak, and the oblique streak may be detected.

REFERENCE SIGNS LIST

1: Plane light source device
10: Light-guiding panel,
11: Light source,
20 to 23: Streak-like region
3: Inspecting device,
30: Information processing device,
31: Imaging device,
32: Stage,
33: Constant current power source
40: Image acquiring unit,
41: First filter operation unit,
42: Second filter operation unit,
43: Detecting unit,
44: Output unit,
45: Storing unit
61, 71, 73, 75: First filter
62, 72, 74, 76: Second filter
90: Input image,
91: Light-emitting surface image,
92: Longitudinal streak

The invention claimed is:

1. A streak-like region detecting device, comprising a processor configured to perform operations comprising:
    operation as an image acquiring unit which acquires an image;
    operation as a first filter operation unit which applies, to the image, a first filter responsive to increase in luminance in a first direction and acquires a first response value as a response value by the first filter at an application position of the first filter;
    operation as a second filter operation unit which applies, to the image, a second filter responsive to decrease in luminance in the first direction and acquires a second response value as a response value by the second filter at an application position of the second filter;
    operation as a detecting unit which calculates an integrated value by adding or averaging the first response value and the second response value and determines the presence or absence of a streak-like region having a width corresponding to the distance between the application position of the first filter and the application position of the second filter in the first direction when the integrated value is greater than a prescribed threshold value; and
    operation as an output unit which outputs information obtained by the detecting unit.

2. The streak-like region detecting device according to claim 1, wherein the processor is configured to perform operation such that:
    operation as the first filter operation unit comprises changing the application position of the first filter and acquiring multiple first response values,
    operation as the second filter operation unit comprises changing the application position of the second filter and acquiring multiple second response values, and
    operation as the detecting unit comprises being capable of detecting multiple kinds of streak-like regions with different widths by changing a combination of first and second response values selected among the multiple first response values and the multiple second response values.

3. The streak-like region detecting device according to claim 1, wherein the the processor is configured to perform operation such that:
    operation as the first filter operation unit comprises acquiring multiple first response values while shifting the application position of the first filter in the first direction, operation as the second filter operation unit comprises acquiring multiple second response values while shifting the application position of the second filter in the first direction, and operation as the detecting unit comprises selecting a combination of first and second response values which maximizes the integrated value among the multiple first response values and the multiple second response values and determines the presence or absence of a streak-like region on the basis of the maximum integrated value.

4. The streak-like region detecting device according to claim 1, wherein the streak-like region comprises a region extending in a second direction that is orthogonal to the first direction, the processor is configured to perform operation such that:

operation as the first filter operation unit comprises acquiring multiple first response values while shifting the application position of the first filter in the second direction, operation as the second filter operation unit comprises acquiring multiple second response values while shifting the application position of the second filter in the second direction, and operation as the detecting unit comprises calculating an integrated value acquired by integrating the multiple first response values and the multiple second response values and determines the presence or absence of a streak-like region extending in the second direction is present on the basis of the integrated value.

5. The streak-like region detecting device according to claim 1, wherein the processor is configured to perform operation such that operation as the output unit comprises outputting the integrated value and a result of detection of the streak-like region.

6. The streak-like region detecting device according to claim 1, wherein the processor is configured to perform operation such that operation as the output unit comprises outputting an image obtained by superposing information indicating the position of the detected streak-like region on the image or a processed image obtained by processing the image.

7. The streak-like region detecting device according to claim 1, wherein the processor is configured to perform operation such that operation as the output unit comprises outputting a one-dimensional luminance profile representing change in a luminance value in the first direction.

8. The streak-like region detecting device according to claim 1, wherein the image acquired by the image acquiring unit comprises a photographed image of a light-emitting surface of a plane light source device, and the processor is configured to perform operation such that operation as the detecting unit comprises being adapted to detect a streak-like bright or dark region appearing because of luminance unevenness in the light-emitting surface.

9. A method for detecting a streak-like region, comprising:

acquiring an image;

applying, to the image, a first filter responsive to increase in luminance in a first direction and acquiring a first response value as a response value by the first filter at an application position of the first filter;

applying, to the image, a second filter responsive to decrease in luminance in the first direction and acquiring a second response value as a response value by the second filter at an application position of the second filter;

calculating an integrated value by adding or averaging the first response value and the second response value and determining the presence or absence of a streak-like region having a width corresponding to the distance between the application position of the first filter and the application position of the second filter in the first direction when the integrated value is greater than a prescribed threshold value; and outputting a result of the calculating.

10. A non-transitory computer readable medium storing a program which allows a computer to execute the method for detecting a streak-like region according to claim 9.

* * * * *